M. TAKANASHI

METHOD FOR THE MANUFACTURE OF LENSES

Filed June 25, 1921

Inventor
Mitsuo Takanashi
By B. Singer,
Attorney

Patented Sept. 4, 1923.

1,466,973

UNITED STATES PATENT OFFICE.

MITSUO TAKANASHI, OF TOKYO, JAPAN.

METHOD FOR THE MANUFACTURE OF LENSES.

Application filed June 25, 1921. Serial No. 480,422.

*To all whom it may concern:*

Be it known that I, MITSUO TAKANASHI, a subject of the Emperor of Japan, residing at No. 1905 Shimo-Shibuya, Shibuya-machi, Toyotama-gun, Tokyo-fu, in the Empire of Japan, have invented certain new and useful Improvements in a Method for the Manufacture of Lenses, of which the following is a specification.

This invention relates to a method of manufacturing lenses, and the object of the invention is to produce lenses by a simple operation, thereby greatly reducing the cost of manufacture.

According to this invention, with the above-mentioned object in view, lenses are manufactured by inserting required number of glass pieces into circular holes formed in a plate of metal or any other comparatively refractory material, and then heating the same in a suitable furnace to such an extent that the inserted glass pieces are molten to a viscous condition and are shaped to lenses each having partial spherical surfaces by the action of their surface tension.

The invention is hereinafter described with reference to the accompanying drawings in which,—

Figure 1:
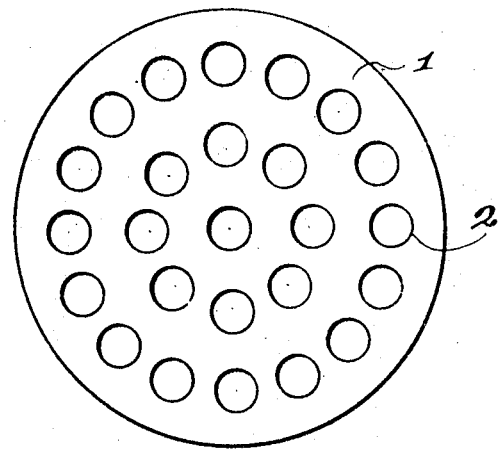
Figure 1 represents a plan of the metallic plate adapted to carry out the method of the invention.
Figure 2:
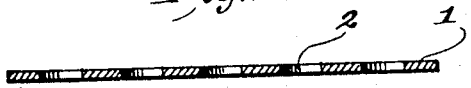
Figure 2 is a section of said plate.
Figure 3:
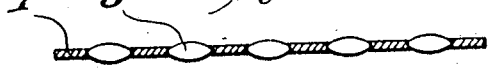
Figure 3 is a similar view, but showing a lens formed in each of the holes in the said plate according to the method of this invention.

In carrying out the invention into effect, a plate 1 as shown in the drawing is used, which is of suitable metal or any other comparatively refractory material. This plate is provided with required number of circular holes 2, as shown in the drawings. In each of these circular holes 2, a piece of solid glass to be shaped to lens is inserted, it being prevented from dropping out. Then the plate 1, with the pieces of glass inserted into the circular holes 2, is put into a suitable furnace, and is heated therein to such an extent that the inserted pieces of material glass are molten to a viscous condition, the viscosity being such that the inserted pieces of glass are not liable to drop out from the holes 2, and thus the molten glass will, in each hole, be shaped to lens 3 having partial spherical surfaces by the action of its surface tension, as shown in Figure 3. The plate 1 is then removed from the furnace and lenses 3 are allowed to cool in a suitable manner.

In this method, a predetermined quantity of blank (glass piece) is inserted in each of the circular holes formed in a thin plate of any refractory material as described in the specification, and the blank is prevented from dropping out of the hole in the plate by friction.

Now, it is to be understood that the present invention is not applied to the manufacture of lens of large dimensions and is particularly applicable to the manufacture of small lens for microscope. The inventor has found by experiments that in the case of manufacture of lens having diameter of less than 12 mm., the molten glass does not sag in the hole in the plate, and that the glass assumes fairly the shape of a convex lens as shown in the drawing. The "R" of the lens varies with the diameter of the hole in the plate and the quantity of the blank.

The invention has gone into commercial use and the inventor has experienced no difficulties at any time in making convex lenses for microscopes by the method as herein described and claimed.

What I claim is:

1. A method for the manufacture of lens, consisting in inserting a piece of glass into a circular hole formed in a plate of refractory material, then heating the same to such an extent that said glass piece is molten to a viscous condition and is shaped to a lens having partial spherical surfaces by the action of its surface tension.

2. A method of manufacture of lenses, consisting in inserting a plurality of pieces of material glass into a plurality of circular holes formed in a plate of comparatively refractory material, then heating the same to such an extent that the said glass pieces are molten to a viscous condition and are shaped to lenses each having partial spherical surfaces by the action of surface tension.

In testimony whereof I affix my signature.

MITSUO TAKANASHI.